United States Patent [19]

Diggs

[11] 4,031,695
[45] June 28, 1977

[54] TREE HEDGING ARRANGEMENT

[76] Inventor: Richard E. Diggs, P.O. Box 776 South 12A Road, Carthage, Mo. 64836

[22] Filed: Oct. 28, 1975

[21] Appl. No.: 626,449

[52] U.S. Cl. .................................. 56/237; 56/13.9; 144/2 Z
[51] Int. Cl.² ........................................ A01D 55/24
[58] Field of Search ............ 56/233, 234, 237, 235, 56/291, 13.9; 144/34 R, 34 F, 2 Z; 47/1

[56] References Cited

UNITED STATES PATENTS

| | | | |
|---|---|---|---|
| 2,746,492 | 5/1956 | De Hardit | 144/34 R |
| 3,487,614 | 1/1970 | Uhor | 56/233 |
| 3,565,372 | 2/1971 | Jones et al. | 144/34 R |
| 3,597,908 | 8/1971 | Schaefer | 56/233 |
| 3,681,901 | 8/1972 | Quick et al. | 56/291 X |

*Primary Examiner*—J. N. Eskovitz
*Attorney, Agent, or Firm*—Fishburn, Gold & Litman

[57] ABSTRACT

A hedging apparatus is disclosed which comprises a wheeled vehicle having a specially adapted chain saw thereon for cutting limbs and branches from trees, hedges, or shrubs, which are planted in rows. The chain saw is provided with a plurality of spaced-apart guide bars which extend forwardly of the cutter chain, thus assuring the severing of limber branches which would otherwise be pushed aside by the saw and remain uncut. Resilient springs in the form of elongated rods can be used in conjunction with the guide bars to prevent chattering of the branches being cut. To particular advantage, a positioner can be provided for setting the chain saw blade at a selected pitch angle and for maintaining the selected pitch angle during a hedging operation. To further advantage, a hopper can also be provided for collection and disposal of the severed limbs and branches during the hedging operation so that they do not have to be subsequently gathered up and hauled to another site for disposal.

14 Claims, 5 Drawing Figures

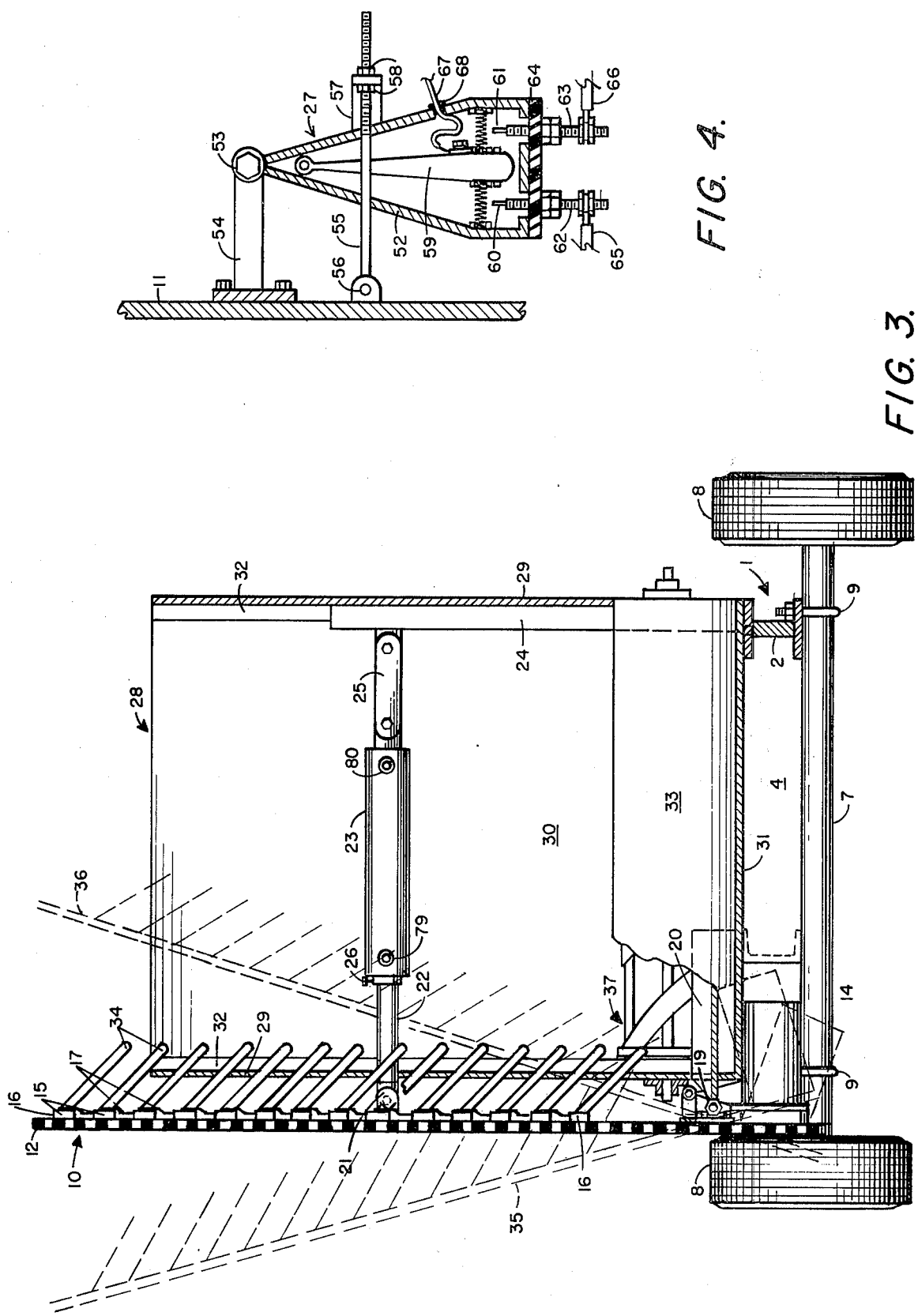

TREE HEDGING ARRANGEMENT

BACKGROUND OF THE INVENTION

This invention pertains to mobile vehicles for trimming or hedging rows of trees, shrubs, brush, hedges and the like, and more particularly to improvements in the cutter assembly on such vehicles, and to provisions thereon for collection and disposal of limbs and branches which are cut during a hedging operation.

It has now become common practice to trim rowed trees in citrus groves or fruit orchards, in order to maintain a tree profile that it is best adapted to mechanical picking, while also opening up the grove or orchard to additional sunlight for improvement of yield.

Previously known trimming and hedging devices are disclosed in U.S. Pat. Nos. 2,299,129; 2,815,048; 2,940,486; 3,192,695; 3,032,956; 3,246,460; 3,597,908; 3,605,392 and 3,635,004. Perusal of these patents will reveal that the devices disclosed therein can, in many instances, be exceedingly large for use between rows of trees, quite expensive, and extremely dangerous to the operator of the machine and to any workers in the vacinity thereof. The element of danger is especially great when the cutter assembly of the trimmer comprises circular saw blades which rotate at high speeds while being driven at high levels of power. Use of circular saw blades under such conditions is highly dangerous in that quite often the blades break, flying in all directions, and when limbs of a large size are cut off they can be thrown at high velocity for a considerable distance. Even though the operator is protected by a cage, he is sometimes severely injured nonetheless, and other workers around the machine are similarly imperiled.

Even though the objectionable size, expense and the great danger associated with some commercially available hedgers has been fully apparent for some time, there has nonetheless remained a need for a safer, smaller and less expensive machine. In addition, there has been an absence of any provision on the mobile vehicle for collecting and disposing of limbs and branches as they are cut of, or for automatically maintaining the pitch angle of the cutter assembly at a selected angle in order to trim or hedge all trees in a row to a chosen profile. With previous trimmers, cut limbs and branches have been allowed to fall to the ground indiscriminately in the grove and a substantial amount of time has been required to pick them up and haul them out of the grove to another site where they are burned. It should also be pointed out that even though some of the previous hedgers have been provided with control apparatus whereby a selected pitch angle of the cutter assembly is established and then maintained during hedging by hand control of the apparatus by the hedger operator, it can be very difficult if no impossible to satisfactorily maintain a desired pitch angle when the hedger moves over uneven or bumpy ground.

Therefore, a principle object of the present invention is to provide a mobile vehicular hedger or trimmer whereby the aforestated dangers and disadvantages of prior machines are circumvented.

Accordingly, one specific object of the present invention is to provide a hedger wherein the cutter for limbs and branches is a chain saw having provisions whereby the saw cuts limber branches rather than merely pushing them aside.

Another object is to provide a hedger of the aforesaid type wherein a selected pitch angle of the saw can be established and then maintained throughout a hedging operation.

Even another object is to provide a hedger of the aforesaid type having means on the mobile vehicle for collecting cut limbs and branches as they fall and, where preferred, for disposing of such cuttings at the site of the hedging operation.

These and other objects and advantages of the present invention will become apparent from the following description thereof and the appended claims.

SUMMARY OF THE INVENTION

The present invention is a hedging apparatus which comprises a wheeled vehicle which rolls over the ground and has a specially adapted powered chain saw mounted thereon. The saw has a chain bar with a rotatively movable cutter chain thereon and is oriented to sever the branches of trees which the hedger rolls past during a hedging operation. In accordance with the invention, the chain saw includes a plurality of rigid guide bars attached to the chain bar and which extend forwardly therefrom beyond the cutter chain, with each of the guide bars being spaced apart along the length of the chain bar.

Advantageously, means are also provided for clamping limbs against the guide bars during cutting, and the chain saw can be pivotally attached at one end at the vehicle for pivoting the saw sideways to a selected pitch angle, while also including means for maintaining the saw at the selected pitch angle in relation to the horizon of the earth.

To further advantage, the vehicle can also include a hopper having side walls, a rear wall, and a floor, and into which the cut limbs fall as soon as they are severed by the saw. The vehicle can further include a chipper for particulating the severed limbs which are collected in the hopper, and a chip impeller means can also be mounted on the vehicle for distributing chips over the surface of the ground while the hedger is in use.

BRIEF DESCRIPTION OF THE DRAWINGS

FIG. 3 is a front view of the hedger of FIG. 1.

FIG. 4 is a sectional side view of an angle detection means which can be attached to the chain saw of the hedger of FIG. 1 and whereby deviation of the chain saw from a selected pitch angle is determined.

DESCRIPTION OF PREFERRED AND ALTERNATIVE EMBODIMENTS

Figure 1:
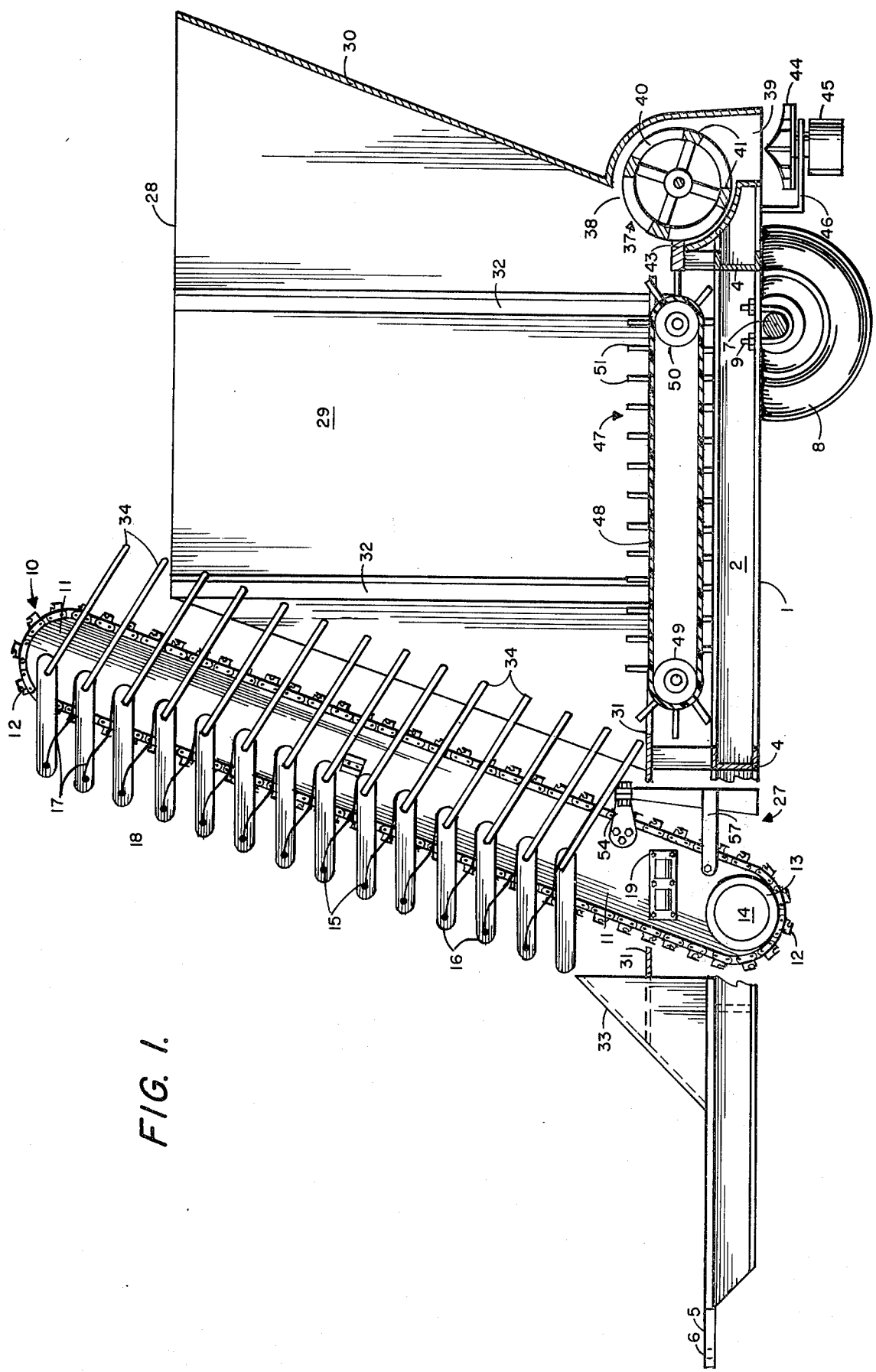
FIG. 1 is a side view, partially in section, of a hedger constructed in accordance with the present invention.

In FIG. 1, the vehicle of the hedger has a main frame, generally represented at 1, which includes a main longitudinal member 2, a secondary longitudinal member 3 (visible in FIG. 2), and cross members 4. The front end of member 2 is shaped to the form of a tang 5 and has an opening 6 for attachment of the hedger to a towing vehicle. An axle 7, having wheels 8 mounted on the outer ends thereof, is attached to the main frame 1 by means of shackle bolts 9.

The chain saw on the hedger is generally represented at 10 and comprises a chain bar 11 and a cutter chain 12 on the outer edge thereof. The cutter chain is adapted for continuous rotational movement on the chain bar and is turned by means of a sprocket 13 which is powered with a hydraulic motor 14. The saw includes a plurality of rigid guide bars 14 attached to one side of the chain bar at spaced intervals along the length thereof. The guide bars extend forwardly from the chain bar behond the cutter chain, and each guide has an outer edge 16 which opposes the outer edge of an adjacent guide bar. The chain bar with the cutter bar thereon can thus be mounted on the vehicle so that it extends outwardly therefrom and whereby the rotational axis of the chain, represented by line X is transversally oriented with respect to the axis of a path, represented by line Y, along which the vehicle moves during a hedging operation.

As shown in the drawings, the chain saw further comprises means for clamping limbs against the guide bars to prevent "chattering" of the limbs while they are being sawed. In the illustrated case, the limb clamping means is a plurality of springs 17 in the form of elongated resilient rods. Each of the springs extends at an angle across the space 18 between two of said guide bars and is deflective away from the outer edge of one guide bar and toward the outer edge of an adjacent guide bar. As shown in the drawings, the springs 17 have an S-shape, are attached at one end to the front ends of the guide bars, and slope rearwardly toward the outer edge of an adjacent guide bar. It will be appreciated, however, that the springs can be attached to the saw at one or more other points, that they can have configurations other than an S-shape, and that still other limb-clamping means can be employed, or even dispensed altogether when the limb being cut are not so limber as to require a clamping means.

The spacing 18 between the guide bars 15 is subject to variation depending on the size of the limbs to be trimmed. The spacing can exceed one inch and, conveniently, can be two or more inches for sawing relatively large limbs. In this respect, the chair saw having the presently disclosed guide bars is superior to reciprocating sickle or cutter bars which are only capable of severing limbs up to about three-quarters of an inch in diameter without breaking or stalling of the blades.

Figure 2:
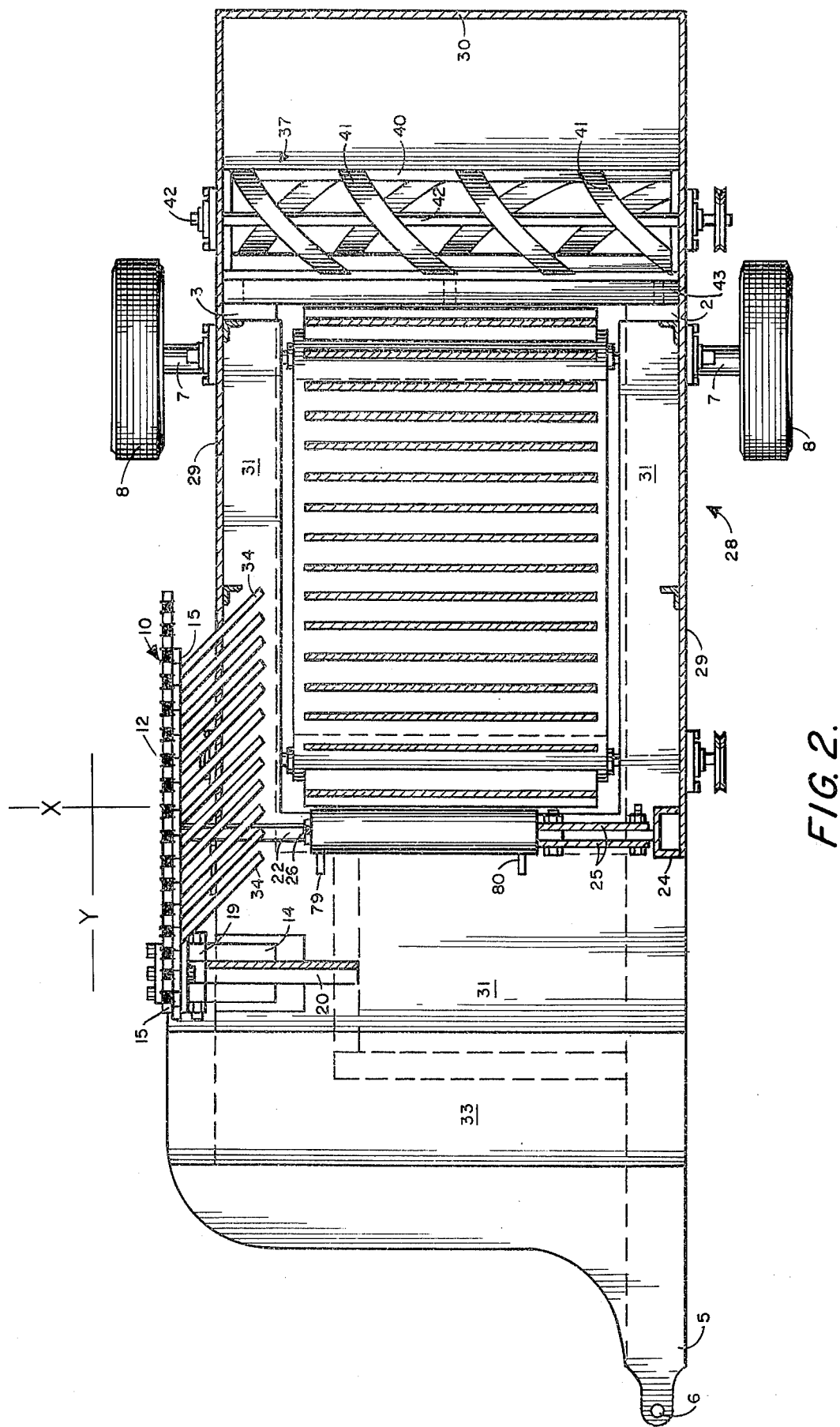
FIG. 2 is a top view of the hedger of FIG. 1.

The chain saw 10 is provided with a pivot joint 19 attached to the lower end of the chain bar 11. As can be seen in FIGS. 2 and 3, this pivot joint provides a pivotal attachment of the saw to the main frame by means of bracket 20 so that the chain bar 11 with the attached chain 12 and motor 14 can be pivoted sideways in both directions as is represented at 35 and 36. The saw is also provided with still another pivot joint 21, above the first joint 19, which receives one end of the thrusting shaft 22 of a hydraulic cylinder 23. The rear end of the cylinder is pivotally connected to a rigid upright frame member 24 by means of interconnecting links 25. Means for actuating the cylinder 23 is not shown in FIGS. 1-3, and will be described later on with reference to FIG. 5, but in any event the cylinder is a component part of means whereby the saw is maintained at a selected pitch angle after having been pivoted sideways. When the pitch angle is to be maintained only in relation to the vehicle, i.e. when the hedger is being towed over even ground where there is little or no tendency for the vehicle to pitch from side to side. In such a case there is no need to supply hydraulic fluid to the cylinder, and in-and-out movement of the thrusting shaft 22 can be prevented by means of a lock bolt 26 on the cylinder. The selected pitch angle on the saw blade is thus set while bolt 26 is loosened, and upon tightening the bolt the selected pitch angle, in relation to the vehicle, is thereafter maintained.

When it is desirable to maintain the saw at a selected pitch angle in relation to the horizon of the earth, i.e. when the hedger is towed over uneven ground which causes the vehicle and the attached saw 10 to pitch from side to side, the saw can further comprise an angle detection means 27 which determines the occurance of an angular deviation and produces an electric signal when the saw deviates from a selected pitch angle. The detected deviation is then transmitted to a pitch angle adjustment means which is also attached to the saw and which is responsive to the signal from the angle detection means so as to effect sideways pivoting of the chain saw in either direction to restore the saw to a selected pitch angle. Such angle detection and adjustment means is a highly advantageous though optional feature which will be described hereinafter in greater detail. In the event it is not used, a jack screw can be substituted for cylinder 23 as a means for establishing and maintaining the saw at a selected pitch angle in relation to the vehicle.

Referring further to FIGS. 1-3, the hedger is provided with a hopper, generally represented at 28, having side walls 29, and end wall 30 at the rear of the hopper, and a floor 31. The side walls 29 are stabilized by the rigid uprights 32 which are attached at their lower ends to the main frame 1. A shield 33 is located ahead of the saw 10 and angles upwardly to deflect limbs so that they slide between the guide bars when the vehicle is being towed.

The purpose of the hopper 28 is to catch and collect limbs as they are severed by means of the saw. As shown in the drawings, the saw comprises a plurality of spaced-apart deflector rods 34, each of which is attached at one end to the saw and slopes rearwardly aand downwardly with respect to the floor 31 of the hopper 28. The use of these deflector rods is optional, but they can be used to particular advantage for deflecting the fall of limbs so that they come to rest into the hopper instead of on the ground. Shorter or longer deflector rods can be used where preferable and practical, and the side wall 29 adjacent saw 10 can be angled outward, if desired, to correspond to a selected pitch angle for the saw. In FIG. 3, an outward pitch angle is represented at 35 whereas an inward pitch angle is represented at 36.

The hopper can be allowed to fill during hedging, if preferred, and can then be towed to a location where severed limbs are emptied from the hopper and disposed of. Accordingly, one of the side walls 29, the rear wall 30, or the floor 31 can be hinged to facilitate emptying. To greater advantage, however, the hedger can further comprise a chipper 37 for particulating limbs which fall into the hopper. The chipper has an inlet opening 38 leading from the hopper and an outlet 39 for discharging chips to the outside. The chipper comprises a rotating cage 40 having cutter bars 41 helically wound thereon. The cage is rotated at high speed by means of a shaft 42 which is driven by a hydraulic motor that is not shown. The chipper further comprises a stationary cutter bar 43 having an edge that is proximal to the helical cutter bars 41. Limbs are severed and thus chipped when they pass over the rear edge of the cutter bar 43. Alternatively, the cutter bars 41 can have a higher pitch angle than shown, or a plurality of straight bars which run transversally of the cage can be used instead.

When the vehicle is provided with a chipper as shown, a rotatable chip impeller 44 can also be located at the chipper outlet so that discharged chips fall onto the impeller and are thereby broadcast outwardly onto the surface of the ground. In FIG. 1, the impeller 44 is driven by means of a hydraulic motor 45. The impeller and the attached motor are mounted on the main frame by means of bracket 46.

When the chipper is used alone or, advantageously, in conjunction with the chip impeller, the limbs which are gathered in the hopper 28 do not have to be hauled to another site distantly located from where trees are being trimmed, and the chips are thus distributed on the ground around the trees as mulch. It will thus be appreciated that use of the hopper alone largely precludes any gathering of cut limbs by hand, or any need for another hauling vehicle, whereas use of the chipper saves a large number of man hours by eliminating the need for hauling the limbs and disposal of them at another location.

Movement of limbs into the inlet opening 38 of the chipper can be facilitated by means of a conveyor 47 which comprises a belt 48 on a driven roller 49 and a freely rotating roller 50. The belt is provided with teeth or tines 51 which grip the limbs and pull them toward the chipper inlet. A conveyor chain can be used alternatively of a belt.

Referring now to FIG. 4, the angle detection means 27 has a sealed casing 52 which encloses an electric switch that is opened and closed by movement of an element of the switch in response to gravity upon change of the selected pitch angle of the chain saw 10. The casing 52 is pivotally attached at the top at 53 to the outer end of a bracket 54 which is bolted at the inner end to the chain bar 11. The repose angle of the angle detection means relative to the guide is adjustable by means of a rod 55 pivotally attached at one end at 56 to the chain bar, and the other end of which is threaded and passes through bracket 57. Nuts 58 are threaded onto 55 and abut each side of bracket 54.

The switch inside casing 52 includes a pendulum 59 which swings from side to side as viewed in the drawings. Electrical contact points 60 and 61 are located on each side of the pendulum and are located at the internal ends of bolts 62 and 63, respectively, which pass through the bottom of the casing and are mounted to insulator plate 64 which is fastened to the casing. Electrically conductive wires 65 and 66 lead from the bolts 62 and 63. A flexible wire 67 is attached to the pendulum 59 and passes out of the casing through an opening which is sealed by means of a grommet 68.

As shown in FIG. 4, the selected pitch angle of the saw is zero, i.e. the saw is vertical in relation to the horizon, and it will be noted that the pendulum is out of contact with either of the contact points 60 and 61. Accordingly, no deviation from the selected pitch angle is being determined. Should the vehicle tilt to one side or the other so that the pitch angle of the saw is changed, the pendulum would touch either contact point 60 or 61, depending on the direction of sideward tilt. A deviation of pitch angle would then be detected, and current would flow through wires 65 and 67 or 66 and 67 to activate an angle adjustment means which will be more fully described with reference to FIG. 5.

When the selected pitch angle of the saw is set at a sideways angle, such as is represented at 35 or 36, the angle of repose of the angle detection means 27 in relation to chain bar 11 is first adjusted by turning nuts 58 on rod 55 so that the pendulum 59 remains out of contact with points 60 or 61 when the saw is at the selected pitch angle, i.e. even though the saw is pitched at an angle to one side the center line of casing 52 is aligned vertically. Coiled springs 69 and 70 on either side of the pendulum dampen the swinging thereof so as to prevent inadvertant contact with points 60 and 61 through vibration of the vehicle or momentary bumps and jars.

Figure 5:
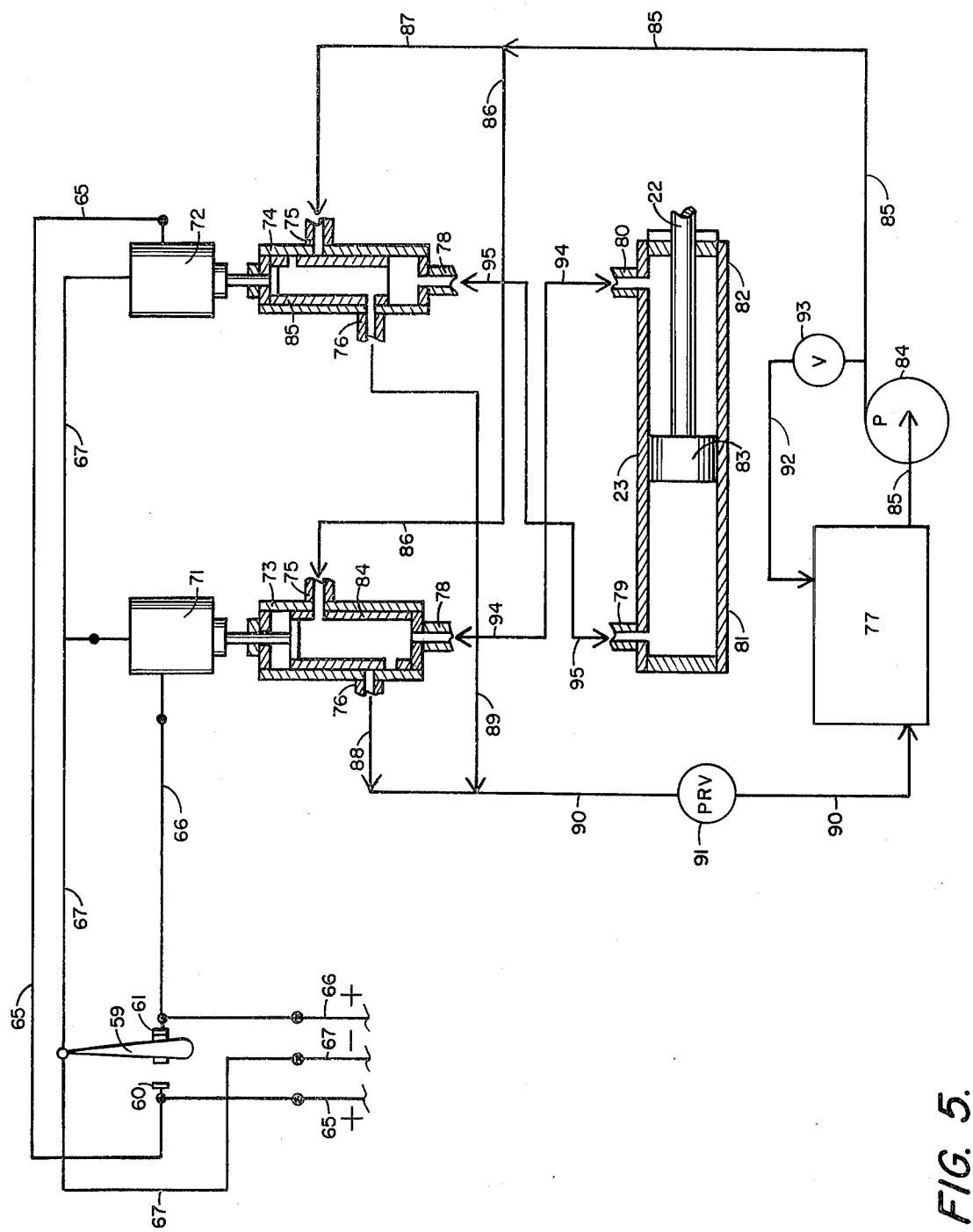
FIG. 5 is a diagrammatic representation of apparatus for automatically maintaining the saw of the hedger of FIG. 1 at a selected pitch angle through use of the angle detection means of FIG. 4 in conjunction with a pitch angle adjustment means.

Use of the angle detection means for maintaining a selected pitch angle on the saw can be more clearly understood by reference in FIG. 5. Wires 65, 66, and 67 lead from the angle detection means to solinoids 71 and 72 as shown. Wire 67 is a common negative lead whereas wires 65 and 66 are individual positive leads. The solinoids operate slide valves 73 and 74 which have inlets 75 for a flowing of pressurized hydraulic fluid, first outlets 76 for return of hydraulic fluid to a surge tank 77, and second outlets 78 for flow of hydraulic fluid to hydraulic cylinder 23. As shown in the drawing, cylinder 23 is double-ended and has passageways 79 and 80 at each end for inflow and outflow of hydraulic fluid from chambers 81 and 82, respectively, on each side of the piston 83 which operates the thrust rod 22.

When the saw is at a selected pitch angle with respect to the horizon of the earth, the sleeves of the valves are held in an upward position by the solinoids, which is the condition when no current is being supplied to the solinoids by the angle detection means 27, i.e. no deviation from the selected pitch angle is being detected and transmitted, and the solinoids are thus not electrically activated. In such a case, pressurized hydraulic fluid from continuously running pump 84 passes through supply line 85 and to valves 73 and 74 through feeder lines 86 and 87, respectively. With the sleeves of both valves upward, the hydraulic fluid passes through both valves and exits through first outlets 76 so that it returns to tank 77 through discharge lines 88 and 89 and return line 90. Accordingly, the pressures in chambers 81 and 82 of cylinder 83 remain equal and thrust shaft 22 is not moved sideways in either direction. By means of a pressure relief valve 91 in line 90, an undesired outflow of fluid from the cylinder chambers 81 and 82 can be prevented when the valve sleeves are up and the weight of the saw tends to pull or push piston 83 toward one side of the cylinder, thus maintaining the saw at the selected pitch angle. When a positive displacement pump is used to pump the hydraulic fluid, part of the fluid can be recirculated back to the surge tank 77 through line 92 and control valve 93, thus providing means for regulating pressure in the valves and cylinder and for preventing damage to the pump when both sleeves of the valves are in an upward position.

FIG. 5 represents a case where the hedger vehicle has tilted and the saw has deviated from a selected pitch angle to an extent where the pendulum of the angle detection means has swung to the right. Contact point 61 is thus abutted by the pendulum so that solinoid 71 is electrically activated and sleeve 84 or valve 73 is pushed downward. Accordingly, pressurized fluid flows into valve 73 through inlet 75 and then passes into line 94 through outlet 78 of the valve and thence into chamber 82 of the cylinder through passageway 80. This forces piston 82 to the left and pulls the thrust shaft 22, which is attached to the saw 10, in the same direction. When the piston 83 moves to the left, hydraulic fluid is displaced from chamber 81 of the cylinder so that it passes out of passageway 79 through line 95, into valve 74, and then to the surge tank 77 through lines 89 and 90. Movement of the piston and shaft continues to the left until the pendulum 59 of the angle detection means 27, which is attached to the saw, returns to a centered position between points 60 and 61 so that both points are open, and at which time solinoid 71 is electrically deactivated, whereupon sleeve 84 of valve 73 is returned to the upward position as is illustrated for valve 74. The saw is thus returned to a selected pitch angle, and when the pendulum 59 is accordingly centered, sleeves of both valves are in the upward position so that flow of hydraulic fluid to or from chambers 81 and 82 stops, and the pressure therein remains balanced so that the pitch angle of the saw is maintained at the last pitch angle to which it was automatically adjusted (the selected pitch angle) until the vehicle again tilts and changes the angle of the saw. When this occurs, either of points 60 or 61 is caused to close so that piston 83 and shaft 22 are caused to move in the proper direction and until the pitch angle is restored, as previously described. It will be appreciated that when the vehicle tilts to the left, a flow of pressurized hydraulic fluid enters chamber 81 of cylinder 23 through valve 74 until the selected pitch angle of the saw is restored, and that the angle adjustment means of FIG. 5 can, therefore, maintain the saw at a selected pitch angle whether the vehicle pitches to right or left.

Hydraulic motors can be used to advantage for supplying power to the chain saw 10, the powered roller 49, the chipper 37, and impeller 34. With a towed hedger vehicle as shown in FIGS. 1–3, pressurized hydraulic fluid can be supplied directly from a tractor, or a pump on the towed vehicle can be driven by means of a mechanical power take-off on the tractor. As an alternative to a towed vehicle, the hedger can be equipped with its own drive-train, steering, and hydraulic systems, and electric motors can be used as a substitute for hydraulic motors where such is preferable and practical.

With regard to the angle adjustment means for maintaining the pitch angle of the saw, a reversible motor could be substituted for hydraulic cylinder 23 as a means for moving the saw from side to side, while using a jack screw which is driven by the motor as a substitute for the thrust rod 22. In similar fashion, one or more mercury switches can be adapted for use as a substitute for the pendulum-contact point arrangement shown in the angle detection means of FIG. 4.

FIG. 5 shows use of a two chambered hydraulic cylinder in conjunction with two valves operated by two solinoids. Alternatively, one solinoid could be adapted to operate both valves, or one valve could be adapted to perform the functions of the two valves shown.

It will further be understood that even though the present invention has been described with reference to specific apparatus, arrangements thereof, conditions of use and the like, even other embodiments will become apparent which are within the spirit and scope of the invention defined by the following claims.

What is claimed and desired to secure by Letters Patent is:

1. A hedging apparatus comprising:
   a. a wheeled vehicle which rolls over the ground;
   b. a powered chain saw on said vehicle, said saw having a chain bar with a rotatively movable cutter chain thereon and being oriented to sever the branches of trees which the vehicle rolls past during a hedging operation; said cutter chain moving about said chain bar in a cutting direction;
   a plurality of guide bars attached to the chain bar and extending forwardly therefrom beyond the cutter chain; the guide bars being spaced apart from each other along the length of the chain bar; and
   d. said guide bars each having a first surface thereof engaging selected branches and restraining the same from motion relative to said cutter chain in the cutting direction; said first surface being blunt from a forwardmost point thereof to a point disposed adjacent to said cutter chain for non-cutting abutment with said selected branches, whereby the selected branches are severed by a chopping, non-sharing motion of said cutting chain.

2. Apparatus as in claim 1 wherein;
   a. said chain bar includes an outward side thereof positioned toward the trees being trimmed; and
   b. said guide bars each extend outwardly of said chain bar outward side.

3. A hedging apparatus comprising:
   a. a wheeled vehicle which rolls over the ground;
   b. a powered chain saw on said vehicle, said saw having a chain bar with a rotatively movable cutter chain thereon and being oriented to sever the branches of trees which the vehicle rolls past during a hedging operation;
   c. a plurality of guide bars being attached to the chain bar and extending forwardly therefrom beyond the cutter chain; the guide bars being spaced apart from each other along the length of the chain bar; and
   d. means clamping the branches against said guide bars during sawing of the branches.

4. Apparatus as in claim 3 wherein the means for clamping limbs comprises a pleurality of springs in the form of elongated resilient rods, each of said springs extending at an angle across the space between two of said guide bars and being deflective away from one guide bar and toward an adjacent guide bar.

5. A hedging apparatus comprising:
   a. a wheeled vehicle which rolls over the ground;
   b. a powered chain saw on said vehicle, said saw having a chain bar with a rotatively movable cutter chain thereon and being oriented to sever the branches of trees which the vehicle rolls past during a hedging operation;
   c. a plurality of guide bars being attached to the chain bar and extending forwardly therefrom beyond the cutter chain, the guide bars being spaced apart from each other along the length of the chain bar; and wherein
   d. said chain saw is pivotally attached at one end to said vehicle for pivoting the saw sideways to a selected pitch angle between vertical and horizontal, and further comprising means for maintaining said saw at a selected pitch angle.

6. Apparatus as in claim 5 wherein the means for maintaining the selected pitch angle is adapted to maintain the saw at a selected pitch angle in relation to the vehicle.

7. Apparatus as in claim 5 wherein the means for maintaining the selected pitch angle is adapted to maintain the saw at a selected pitch angle in relation to the horizon of the earth.

8. Apparatus as in claim 7 wherein the means for maintaining the saw at a selected pitch angle comprises:
   a. an angle detection means attached to said saw which determines the occurance of an angular deviation and produces an electric signal when the saw deviates from a selected pitch angle,
   b. pitch angle adjustment means which is responsive to said signal and which upon receiving the signal pivots said saw sideways until it is restored to the selected pitch angle, and
   c. means for transmitting said signal to said pitch angle adjustment means.

9. Apparatus as in claim 8 wherein said angle detection means comprises an electric switch that is opened and closed by movement of an element of the switch in response to gravity upon change of the pitch angle of the chain saw.

10. Apparatus as in claim 9 wherein the pitch angle adjustment means comprises a hydraulic cylinder attached to the chain saw at one end and to said vehicle at the other end, means for supplying hydraulic fluid under pressure to said cylinder, an electrically responsive valve for starting and stopping the flow for hydraulic fluid to the cylinder, and wherein the flow of hydraulic fluid to the cylinder is started and stopped by opening and closing said switch.

11. A hedging apparatus comprising:
   a. a wheeled vehicle which rolls over the ground;
   b. a powered chain saw on said vehicle, said saw having a chain bar with a rotatively movable cutter chain thereon and being oriented to sever the branches of trees which the vehicle rolls past during a hedging operation;
   c. a plurality of guide bars being attached to the chain bar and extending forwardly therefrom beyond the cutter chain; the guide bars being spaced apart from each other along the length of the chain bar; wherein
   d. said vehicle further comprising a hopper located rearwardly of the chain saw, said hopper having side walls, a rear wall and a floor; and
   e. said chain saw further comprising a plurality of spaced-apart deflector rods, each of which is attached at one end to the chain bar and slopes rearwardly and downwardly with respect to the floor of said hopper.

12. A hedging apparatus comprising:
   a. a wheeled vehicle which rolls over the ground;
   b. a powered chain saw on said vehicle, said saw having a chain bar with a rotatively movable cutter chain thereon and being oriented to sever the branches of trees which the vehicle rolls past during a hedging operation;
   c. a plurality of guide bars being attached to the chain bar and extending forwardly therefrom beyond the cutter chain; the guide bars being spaced apart from each other along the length of the chain bar; wherein
   d. said vehicle further comprising a hopper located rearwardly of the chain saw, said hopper having side walls, a rear wall, and a floor; and including
   e. a chipper for particulating limbs which fall into said hopper, said chipper having an inlet opening leading from the hopper and an outlet for discharging chips to the outside.

13. Apparatus as in claim 12 and further comprising means for feeding from said hopper into said chipper.

14. Apparatus as in claim 12 and further comprising a rotatable impeller at the hopper outlet onto which chips are discharged and are thus broadcasted outwardly onto the surface of the ground.

* * * * *